(12) United States Patent
Horiyama (10) Patent No.: US 10,110,453 B2
(45) Date of Patent: Oct. 23, 2018

(54) NETWORK SYSTEM AND DEVICE MANAGEMENT METHOD

(71) Applicant: CANON KABUSHIKI KAISHA, Tokyo (JP)

(72) Inventor: Jun Horiyama, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 403 days.

(21) Appl. No.: 14/503,852

(22) Filed: Oct. 1, 2014

(65) Prior Publication Data

US 2015/0109453 A1 Apr. 23, 2015

(30) Foreign Application Priority Data

Oct. 22, 2013 (JP) ................... 2013-219508

(51) Int. Cl.
| | | |
|---|---|---|
| *H04L 12/26* | (2006.01) | |
| *H04N 1/00* | (2006.01) | |
| *H04N 1/32* | (2006.01) | |
| *H04N 7/18* | (2006.01) | |

(52) U.S. Cl.
CPC ....... *H04L 43/0823* (2013.01); *H04N 1/0048* (2013.01); *H04N 1/00472* (2013.01); *H04N 1/00477* (2013.01); *H04N 1/00771* (2013.01); *H04N 7/181* (2013.01)

(58) Field of Classification Search
CPC .................................. H04L 43/0823
USPC .................................. 348/143, 159
See application file for complete search history.

(56) References Cited

U.S. PATENT DOCUMENTS

| 5,509,009 A | 4/1996 | Laycock et al. |
| 6,583,813 B1 * | 6/2003 | Enright ................. G06Q 20/18 |
| | | 348/143 |
| 6,698,021 B1 * | 2/2004 | Amini ............. G08B 13/19656 |
| | | 348/143 |
| 7,802,724 B1 | 9/2010 | Nohr |
| 8,103,545 B2 | 1/2012 | Ramer et al. |
| 9,143,672 B2 | 9/2015 | Creamer et al. |

(Continued)

FOREIGN PATENT DOCUMENTS

| JP | 2001-006071 A | 1/2001 |
| JP | 2007-104149 A | 4/2007 |

(Continued)

OTHER PUBLICATIONS

Matsuda, U.S. Appl. No. 14/501,597, filed Sep. 30, 2014, entitled, "Management Method for Network System and Network Device, Network Device and Control Method Therefor, and Management System".

(Continued)

*Primary Examiner* — Christopher S Kelley
*Assistant Examiner* — Asmamaw G Tarko
(74) *Attorney, Agent, or Firm* — Carter, Deluca, Farrell & Schmidt, LLP (57) ABSTRACT

When a device management server requests obtainment of recorded video at the time of an error in an image forming apparatus, a device management client confirms that there is a request for obtainment of recorded video, and makes a request for desired recorded video to a camera management server. The device management server receives recorded video from the camera management server through the device management client.

6 Claims, 9 Drawing Sheets

(56) References Cited

U.S. PATENT DOCUMENTS

| | | | |
|---|---|---|---|
| 2003/0202099 A1* | 10/2003 | Nakamura | H04N 7/181 348/153 |
| 2005/0132414 A1* | 6/2005 | Bentley | G08B 13/19606 725/105 |
| 2006/0068818 A1 | 3/2006 | Leitersdorf et al. | |
| 2007/0174489 A1 | 7/2007 | Iwabuchi | |
| 2010/0295944 A1* | 11/2010 | Takeuchi | G06K 9/00771 348/143 |
| 2011/0122995 A1 | 5/2011 | Ferro, Jr. | |
| 2011/0157227 A1 | 6/2011 | Ptucha et al. | |
| 2012/0154608 A1 | 6/2012 | Ko | |
| 2012/0195425 A1 | 8/2012 | Kim et al. | |
| 2012/0229633 A1 | 9/2012 | Boucino et al. | |
| 2013/0235234 A1 | 9/2013 | Cucci et al. | |
| 2014/0370958 A1 | 12/2014 | Lutnick | |
| 2016/0027076 A1 | 1/2016 | Jackson et al. | |
| 2016/0105847 A1 | 4/2016 | Smith et al. | |

FOREIGN PATENT DOCUMENTS

| | | |
|---|---|---|
| JP | 2008-197152 A | 8/2008 |
| JP | 2011-054060 A | 3/2011 |

OTHER PUBLICATIONS

U.S. Final Office Action issued in corresponding U.S. Appl. No. 14/501,597 dated May 10, 2017.

U.S. Office Action issued in corresponding U.S. Appl. No. 14/501,597 dated Dec. 30, 2016.

Japanese Office Action dated Nov. 6, 2017 in corresponding Japanese Patent Application No. 2013-219508 together with English translation, 8 pages.

Notice of Allowance issued in corresponding U.S. Appl. No. 14/501,597 dated Aug. 10, 2017.

* cited by examiner

DEVICE MANAGEMENT TABLE (400)

| DEVICE SERIAL ID | IP ADDRESS | MANUFACTURER NAME | MODEL NAME | DEVICE TYPE | COLOR CLASSIFICATION | INSTALLATION LOCATION |
|---|---|---|---|---|---|---|
| NNN000001 | 192.168.1.101 | OANON | C5000 | MFP | COLOR | 1F |
| NNN000002 | 192.168.1.102 | OANON | L3500 | SFP | MONOCHROME | 3F |
| 401 | 402 | 403 | 404 | 405 | 406 | 407 |

FIG. 5

NETWORK CAMERA MANAGEMENT TABLE (500)

| IP ADDRESS | MANUFACTURER NAME | MODEL NAME | CAMERA TYPE | CAMERA NAME | INSTALLATION LOCATION |
|---|---|---|---|---|---|
| 192.168.2.101 | OANON | WV-1 | PAN/TILT | WV-1(1F RoomA) | 1F RoomA |
| 192.168.2.102 | OANON | WV-9 | WIDE-ANGLED | WV-9(3F RoomC) | 3F RoomC |
| 192.168.2.103 | OANON | WV-11 | FIXED BOX-TYPE | WV-11(4F RoomD) | 4F RoomD |
| 501 | 502 | 503 | 504 | 505 | 506 |

F I G. 6

600

| ERROR ID | ERROR START DATE-TIME | ERROR END DATE-TIME | ERROR LEVEL | ERROR CODE | LOCATION |
|---|---|---|---|---|---|
| E001-00000001 | 2012/05/15 09:22:43 | 2012/05/15 09:32:02 | WARNING | E62001 | MAIN BODY |
| E001-00000002 | 2012/05/15 11:12:53 | 2012/05/15 13:05:13 | ERROR | E19005 | FINISHER A1 |

601 602 603 604 605 606

F I G. 7

700

| ERROR LOG TABLE | | | | | | |
|---|---|---|---|---|---|---|
| DEVICE SERIAL ID | ERROR ID | ERROR START DATE-TIME | ERROR END DATE-TIME | ERROR LEVEL | ERROR CODE | LOCATION |
| NNN000001 | E001-00000001 | 2012/05/15 09:22:43 | 2012/05/15 09:32:02 | WARNING | E62001 | MAIN BODY |
| NNN000001 | E001-00000002 | 2012/05/15 11:12:53 | 2012/05/15 13:05:13 | ERROR | E19005 | FINISHER A1 |

910 — DEVICE/ERROR LIST (RECORDED DATA ACQUISITION) ☒

SELECT DEVICE FOR WHICH RECORDED DATA IS REQUIRED

| DEVICE SERIAL ID | MODEL NAME | ERROR CONTENT | DATE-TIME OF OCCURRENCE |
|---|---|---|---|
| ☑ NNN000001 | C5000 | COVER OPEN | 2013/05/24 08:32:14 |
| ☐ NNN000002 | L3500 | OUT OF PAPER | 2013/05/24 10:08:39 |
| ☐ NNN000003 | C4000 | PAPER JAM | 2013/05/24 14:58:44 |

— 911

[COLLECT RECORDED DATA] 912   [CANCEL] 913

FIG. 9B

920 — RECORDED DATA TIME SETTING ☒

SELECT TIME FOR WHICH RECORDED DATA IS REQUIRED

| DEVICE SERIAL ID | MODEL NAME | ERROR CONTENT | DATE-TIME OF OCCURRENCE |
|---|---|---|---|
| NNN000001 | C5000 | COVER OPEN | 2013/05/24 08:32:14 |

— 921

START TIME: [10 MIN BEFORE ERROR ▽] ~ END TIME: [UNTIL TIME OF ERROR ▽] — 922

[EXECUTE RECORDED DATA COLLECTION] 923   [CANCEL] 924

FIG. 10

| NETWORK CAMERA/DEVICE CORRESPONDENCE TABLE ||||
| NETWORK CAMERA ID | DEVICE SERIAL ID | TIME PERIOD DESIGNATION | IMAGE QUALITY |
| --- | --- | --- | --- |
| CCC_001 | NNN000001 | YES | HIGH |
| CCC_001 | NNN000002 | YES | HIGH |
| CCC_002 | NNN000001 | YES | MEDIUM |
| CCC_002 | NNN000003 | YES | MEDIUM |
| CCC_003 | NNN000001 | NO | LOW (OMNIDIRECTIONAL) |
| CCC_003 | NNN000002 | NO | LOW (OMNIDIRECTIONAL) |
| CCC_003 | NNN000003 | NO | LOW (OMNIDIRECTIONAL) |

NETWORK SYSTEM AND DEVICE MANAGEMENT METHOD

BACKGROUND OF THE INVENTION

Field of the Invention

The present invention relates to a network system and a device management method, and, for example, relates to a network system and a device management method for managing and displaying images relating to the utilization status of image forming apparatuses.

Description of the Related Art

As a technology for managing image forming apparatuses typified by multi-function peripherals connected to a network in an office or the like, a method in which the user notifies printed job and error histories to an administrator is known. Also, a technology that involves monitoring the utilization status of image forming apparatuses by a device management system coordinating with network cameras is under consideration.

For example, in Japanese Patent Laid-Open No. 2008-197152, video of a period including from when printed material is output until when a person removes the paper output is recorded by utilizing notifications from the image forming apparatus such as job start, job end and discharge unit paper removal. Managing output jobs in association with this video enables video of a person who has taken someone else's output to be specified.

Japanese Patent Laid-Open No. 2008-197152 is premised on the image forming apparatus and the monitoring system always operating in tandem with each other, since recording is started and ended by the monitoring system detecting the notifications of all print processes (from the start of a print job until the end of the print job and removal of paper from the discharge unit) from the image forming apparatus. Also, although it is possible to check for someone removing another person's paper output, either intentionally or accidently, and the like, it is not possible to extract recorded video related to various errors that have occurred in an image forming apparatus.

SUMMARY OF THE INVENTION

The present invention has been made in view of the above problems, and it is an object of the invention to extract video regarding a targeted image forming apparatus from recorded video that has already been recorded, and also to perform scheduled recording of a specified image forming apparatus at a set time or under set conditions.

The present invention has the following configuration.

In a network system including a management system in which a network device is managed, a client, and a camera system having a network camera, the management system includes a management unit that manages identification information of a network camera capable of monitoring the network device, and a designation unit that designates a period of recorded data to be requested to the camera system, and the client includes an obtainment unit that obtains the identification information on the network camera and the designated period from the management system, a request unit that makes a request for recorded data to the camera system, using the obtained identification information of the network camera and designated period, and a transmission unit that transmits recorded data received in response to the request to the management system.

According to the present invention, it is possible, in the case where an error occurs during usage of an image forming apparatus, to extract video regarding the targeted image forming apparatus from recorded video that has already been recorded. Also, since scheduled recording of a designated image forming apparatus at a set time or under set conditions can be performed, it is possible to refer to information relating to the circumstances of the error and to recorded video that serves to support this information.

Further features of the present invention will become apparent from the following description of exemplary embodiments with reference to the attached drawings.

DESCRIPTION OF THE EMBODIMENTS

Embodiment 1

Figure 1:
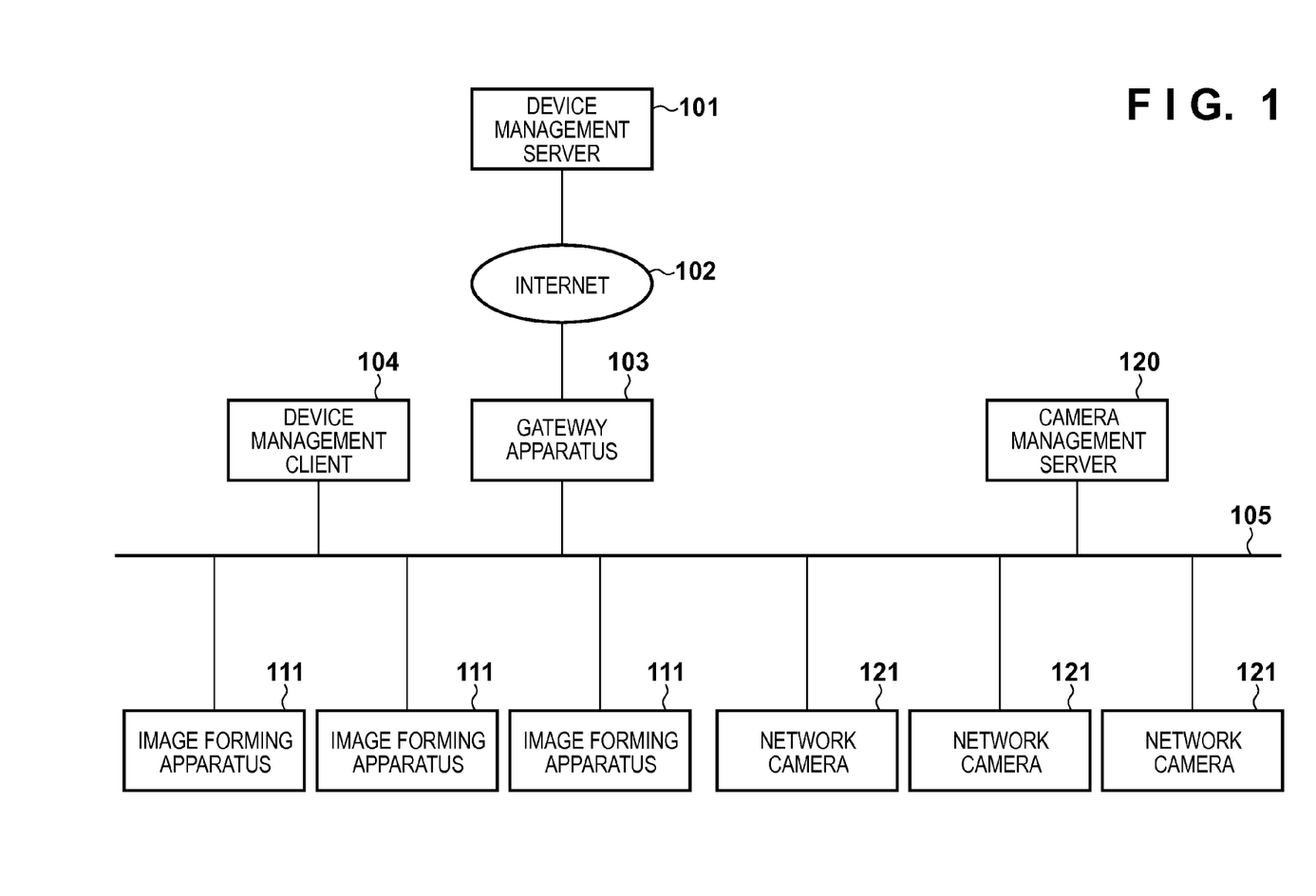
FIG. 1 is a diagram showing a system configuration and a network configuration for carrying out the present invention.

Hereinafter, embodiments for carrying out the present invention will be described with reference to the drawings. FIG. 1 shows an exemplary configuration of a network system serving as a device management system according to the embodiments of the present invention. First, a management system including a device management server 101 manages network devices such as image forming apparatuses 111 including printers, multifunction copiers and the like in a cloud environment. Each image forming apparatus is connected to the device management server 101 through the Internet 102, via a gateway apparatus 103 that exists on a network 105. A device management client 104 (also referred to simply as a client) manages the image forming apparatuses 111 in an on-premise environment, and transmits management information to the device management server 101 as needed. The image forming apparatuses 111 receive print jobs generated by a computer apparatus (not shown) through the network 105, and print the print jobs.

Network cameras 121 deliver video to the network 105. A camera management server 120 records the video from the network cameras 121. The camera management server 120 and the network cameras 121 are also collectively referred to as a camera system. As for the number of image forming apparatuses 111 and network cameras 121, there may be one of each or a plurality of each. There may also be a plurality of camera management servers 120. The network cameras 121 are apparatuses that generate time-series electronic data such as video data. Also, the network cameras 121 may be apparatuses that transmit audio data other than video or the time-series data of a sensor such as a thermometer, in addition to or instead of video. A main application of the system of the embodiments is the management and monitoring of image forming apparatuses 111.

Note that the device management server 101 is assumed to be installed in a cloud environment in the present embodiment, but may also obviously be an on-premise server installed in a user's network. Also, in the case where the device management server 101 is a server in an on-premise environment, the device management client 104 may be removed from the configuration, and the image forming apparatuses 111 may transmit management information directly to the device management server 101.

Hardware Block Diagram of Information Processing Function

Figure 2:
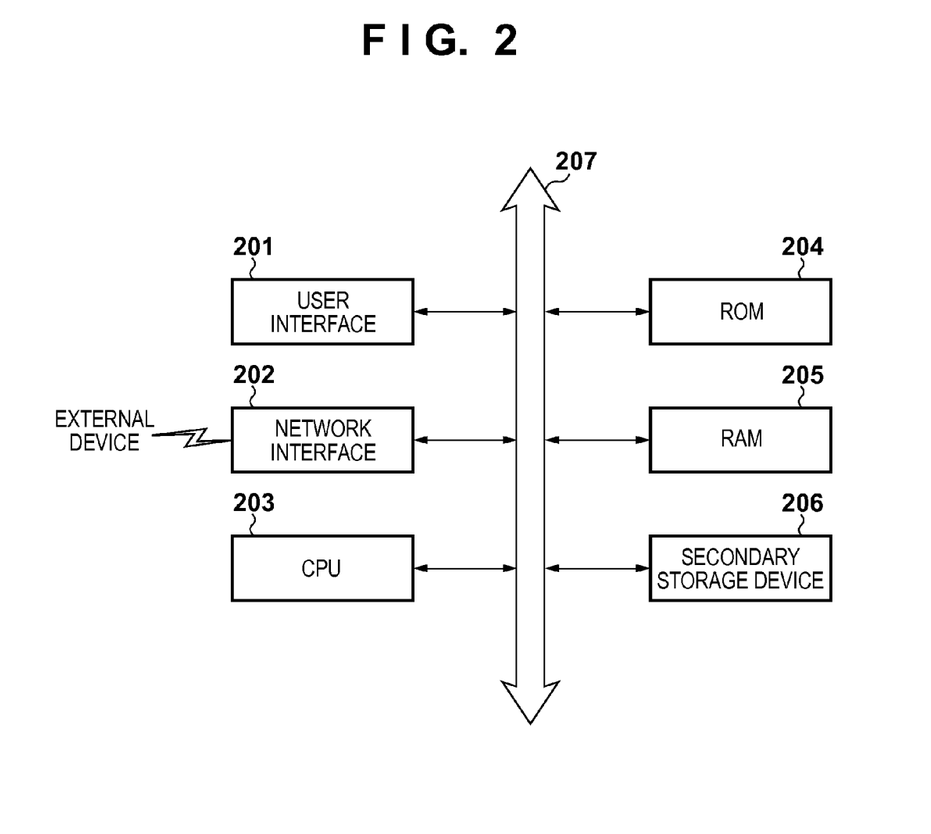
FIG. 2 is a hardware block diagram of an information processing function.

FIG. 2 shows a module block diagram of an information processing function of the image forming apparatuses 111, the device management server 101, the device management client 104, the camera management server 120, and the network cameras 121. A user interface 201 performs input/output of information using a display, keyboard, mouse, touch panel or the like. A computer that is not provided with this hardware can also be connected and operated from another computer, using a remote desktop, a remote shell or the like. A network interface 202 connects to a network such as a LAN, and communicates with other computers and network devices. A ROM 204 is a ROM on which built-in computer programs and data are recorded. A RAM 205 is a RAM having a temporarily memory area. A secondary storage device 206 is a secondary storage device that is typified by a HDD. A CPU 203 executes programs loaded from the ROM 204, the RAM 205, the secondary storage device 206, and the like. The individual units are connected via an input/output interface 207.

Description of Software Configuration and Network Interconnection

Figure 3:
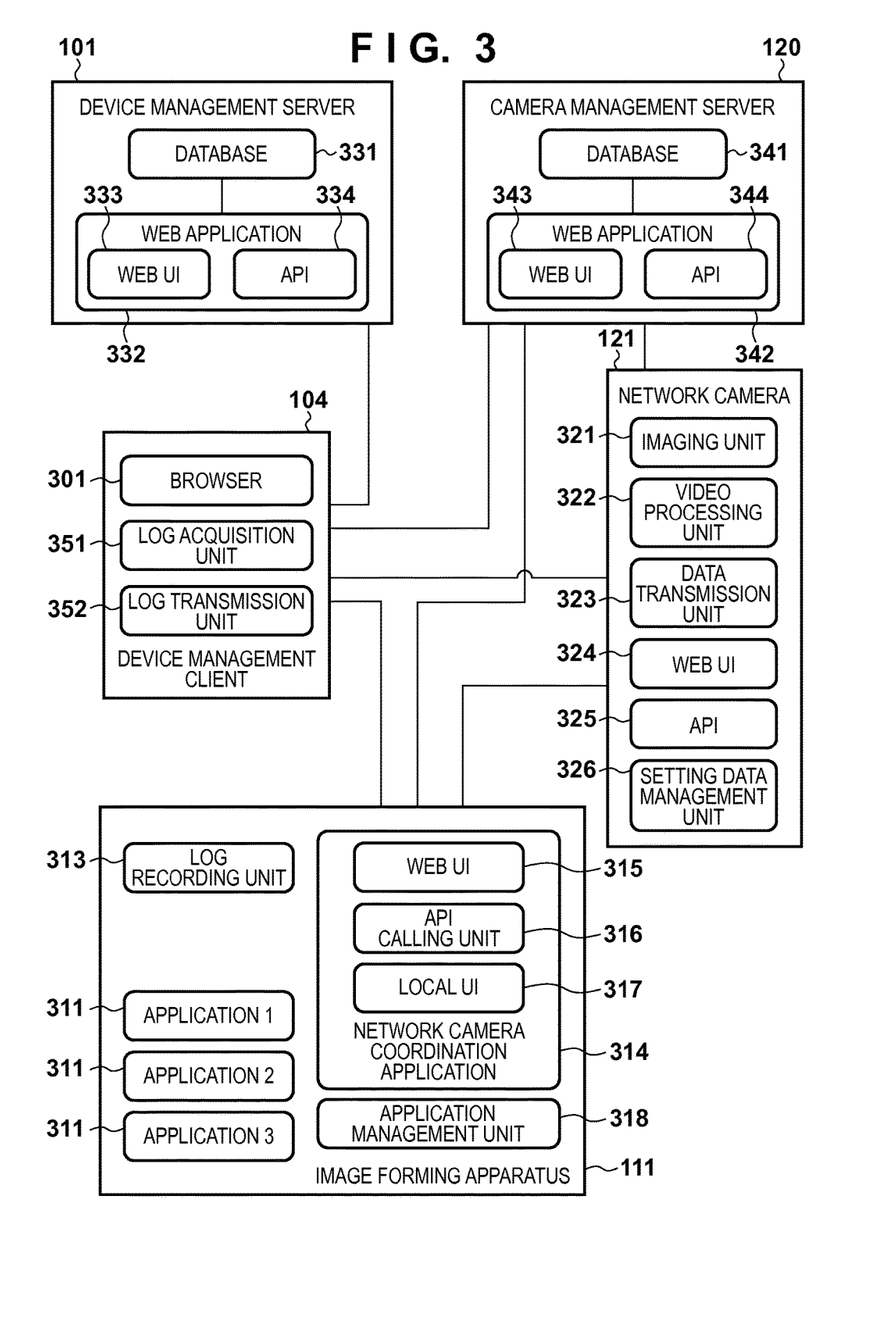
FIG. 3 is a diagram illustrating the software configuration and network interconnection of the system.

FIG. 3 shows a software configuration of the system and interconnection via networks. A database 331 is provided in the device management server 101, and holds data required by the respective functions of the device management server. A Web application 332 provides a Web user interface (hereinafter, Web UI) 333 and an application programming interface (hereinafter, API) 334. The Web application 332 processes requests from other devices through a network, and accesses data in the database 331 as needed to execute various functions and return a response.

A database 341 is provided in the camera management server 120, and holds data required by the respective functions of the camera management server 120. A Web application 342 provides a Web user interface (hereinafter, Web UI) 343 and an application programming interface (hereinafter, API) 344. The Web application 342 processes requests from other devices through a network, and accesses data in the database 341 as needed to execute various functions and return a response.

An imaging unit 321 of the network camera 121 obtains an image by controlling the lenses, image sensor, and the like of the camera. A video processing unit 322 performs processing on the raw image obtained by the imaging unit 321 and obtains video data or the like. Also, the video processing unit 322 performs additional processing such as image recognition and obtains additional information from the image or video. A data transmission unit 323 transmits the video data to other devices on the network. A Web UI 324 provides a viewer screen of the network camera and a management screen. On the viewer screen, the user is able to manipulate the orientation, zoom, focus and the like of the camera while checking video taken by the camera. On the management screen, preset registration of the image capture position of the camera, designation of processing that is performed by the video processing unit 322, address registration of video data to be transmitted by the data transmission unit 323 and the like can be performed. An API 325 carries out operation of the camera, setting data registration and the like, as a result of requests from other devices. A setting data management unit 326 holds setting data for the imaging unit 321, the video processing unit 322, and the data transmission unit 323.

An application 311 is executed by the image forming apparatus 111. A plurality of applications 311 can be installed in the image forming apparatus 111 and executed, according to the function and purpose thereof. These include applications for copying, scanning, printing and the like, for example. A log recording unit 313 records and stores logs such as a job log, an error log and an operation log, in accordance with requests from an application 311. The network camera coordination application 314 is provided with a Web UI 315, an API calling unit 316, and a local UI 317. The API calling unit 316 calls the API 334 of the device management server 101, the API 344 of the camera management server 120 and the API 325 of the network camera 121, and executes required processing. The local UI 317 provides an operation screen of the network camera coordination application to the user interface 201 of the image forming apparatus 111. An application management unit 318 manages or controls installing, uninstalling, starting, stopping and the like of applications in the image forming apparatus 111.

A browser 301 is installed on the device management client 104, and accesses the respective Web UIs of the aforementioned devices and provides display and operation of screens for executing various functions. A log obtainment unit 351 obtains logs recorded by the log record unit 313 of the image forming apparatus 111. A log transmission unit 352 transmits the logs of the image forming apparatus 111 obtained by the log obtainment unit 351 to the device management server 101.

Note that, in the present embodiment, the device management client 104 is configured to collect the logs of the image forming apparatus 111, and collectively transmit the logs to the device management server 101. However, logs may be transmitted from the image forming apparatus 111 to the device management server 101, by providing the image forming apparatus 111 with a log transmission unit (not shown).

Device Management Table and Network Camera Management Table

Figure 4:
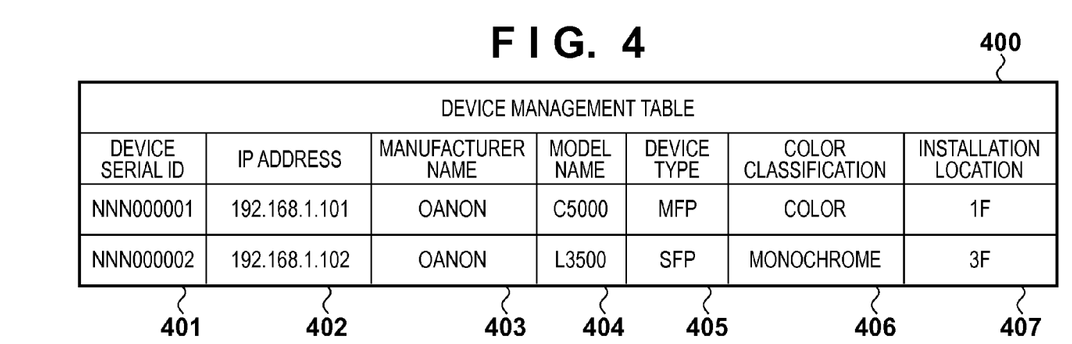
FIG. 4 is a diagram showing a device management table.
Figure 5:
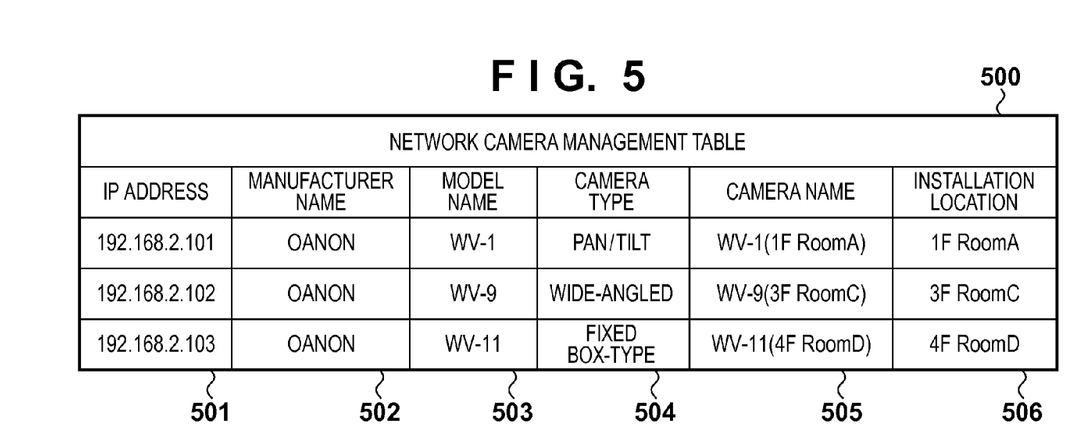
FIG. 5 is a diagram showing a network camera management table.

FIGS. 4 and 5 are illustrative diagrams showing various tables in the database 331 of the device management server 101 and in the database 341 of the camera management server 120. A device management table 400 is a table in the database 331 for managing a plurality of image forming apparatuses 111. In the device management table 400, Device Serial ID 401 is a column storing a device serial ID of the image forming apparatus 111. IP Address 402 is a column storing an IP address of the image forming apparatus 111. Manufacturer Name 403 is a column storing the name of the manufacturer. Model Name 404 is a column storing the model name. Device Type 405 is a column storing the type of device such as MFP, SFP or the like. Color Classification 406 is a column storing a color classification representing whether the image forming apparatus 111 has color printing capability or monochrome printing capability. Installation Location 407 is a column storing installation location information of the image forming apparatus. The device serial IDs 401 are unique IDs identifying individual image forming apparatuses. A device serial ID is allocated to each individual image forming apparatus at the time of manufacture and recorded in a nonvolatile storage area, thus enabling the image forming apparatus itself to subsequently read out the device serial ID. If the device serial ID is known, required information registered in the device management table 400 such as the model name of the image forming apparatus can be specified, with reference to the device information management table 400. An image forming apparatus 111, at the time of being registered for management by the device management server 101, transmits the information of columns 401 to 407 relating to itself, and the device management server 101 adds a record to the device management table 400.

A network camera management table 500 is a table in the database 341 for managing a plurality of network cameras 121. In the network camera management table 500, IP Address 501 is a column for storing an IP address which is identification information for connecting to the network camera 121. Manufacturer Name 502 is a column storing the name of the manufacturer. Model Name 503 is a column storing the model name. Camera Type 504 is a column storing the type of camera such as pan/tilt, wide-angled or fixed box-type. Camera Name 505 is a column storing a camera name which is identification information set for each individual network camera 121. Installation Location 506 is a column storing installation location information for each individual network camera 121.

Error Log Record

Figure 6:
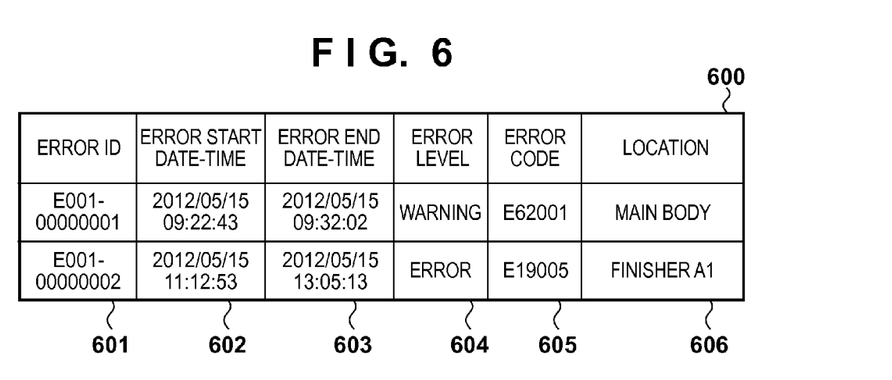
FIG. 6 is a diagram showing an error log record.

FIG. 6 is a diagram showing records of a log that is recorded in the log recording unit 313 of the image forming apparatus 111. An error log record 600 is one record of a log that records history information of errors that have occurred in the image forming apparatus. In the error log record 600, Error ID 601 is a column storing an error ID which is an ID unique to each image forming apparatus. Start Date-Time 602 is a column storing the start date and time of the error. End Date-Time 603 is a column storing the end date and time of the error. Error Level 604 is a column storing an error level representing the severity of the error. Error Code 605 is a column storing an error code for identifying the type of error. Location of Occurrence 606 is a column storing the location where the error occurred.

Error Log Table

Figure 7:
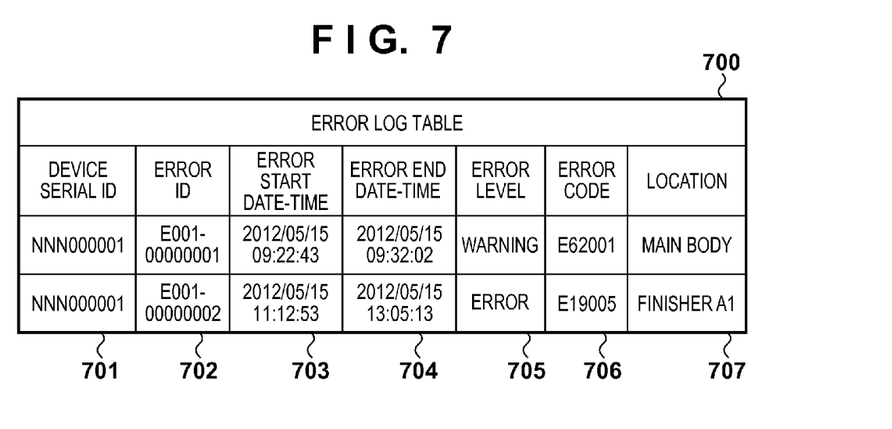
FIG. 7 is a diagram showing an error log table.

FIG. 7 is a diagram illustrating a table in the database 331. An error log table 700 is an error log table for registering error log records received from the image forming apparatuses 111. Device Serial ID 701 is a column for storing the device serial ID of the image forming apparatus 111 that transmitted the job log record. Columns 702 to 707 are columns in which the values of columns 601 to 606 of the error log record 600 are stored.

The log obtainment unit 351 of the device management client 104 obtains the error record 600 recorded in the log record unit 313 by the image forming apparatus 111. Subsequently, the log transmission unit 352 of the device management client 104 calls the API 334 of the device management server 101, and transmits the error log record 600. The Web application 332 stores the received log record in the error log table 700 of the database 331. The device management server 101 thereby manages the occurrence of errors in a plurality of image forming apparatuses 111 from the past to the present. For example, a device management function for displaying and notifying a warning when an error log having a warning error level is received can be provided.

Processing in which Device Management Server Receives Recorded Video

Figure 8:
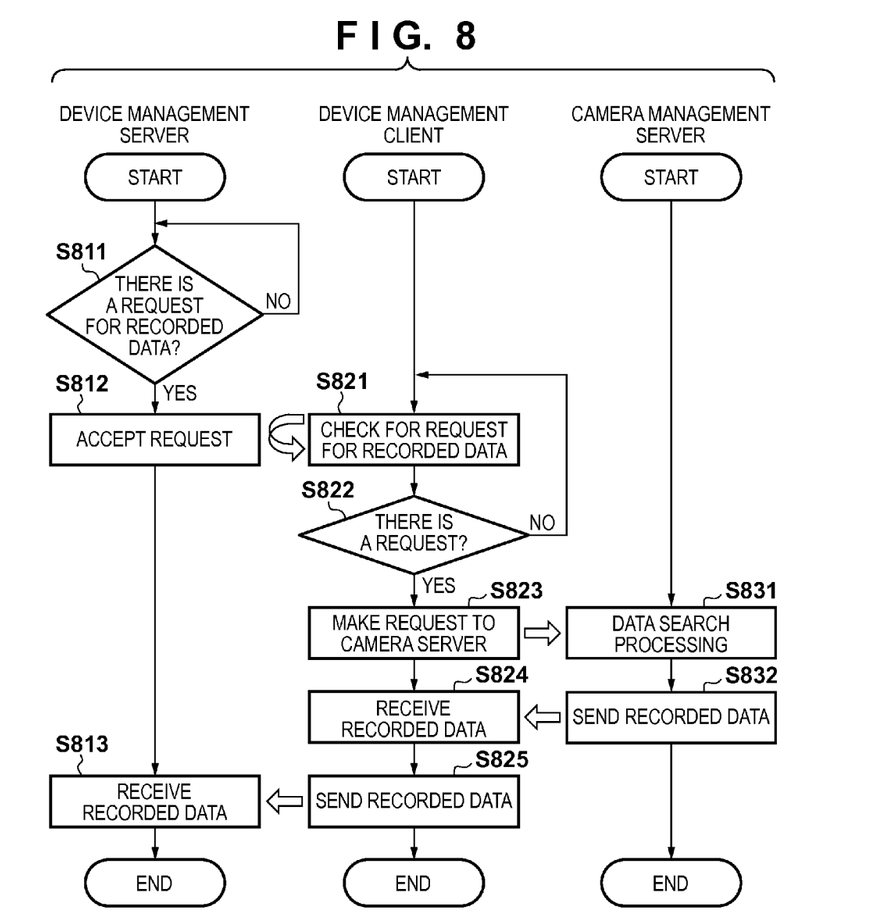
FIG. 8 is a flowchart showing processing in which the device management server receives recorded video.

FIG. 8 is a flowchart representing respective processing procedures by the device management server 101, the device management client 104 and the camera management server 120, according to which the device management server 101 illustrating the present embodiment, when triggered by the occurrence of an error in an image forming apparatus 111, obtains recorded video of the area around the image forming apparatus 111 at the time of the error. First, the device management server 101, in step S811, determines whether there is a request for recorded video. Whether or not there is a request is checked periodically, and if there is a request, the device management server 101 performs acceptance processing at step S812.

Figure 9A:
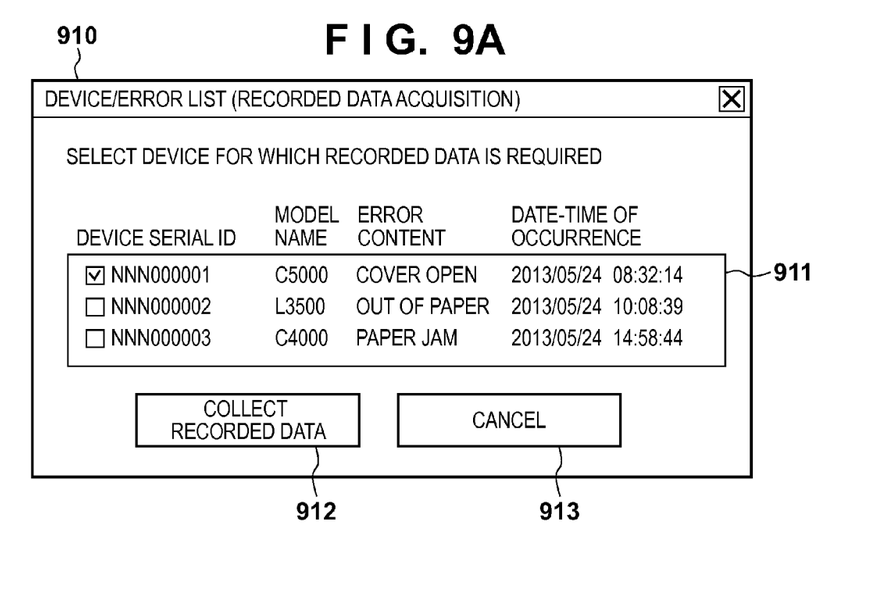
FIG. 9A is a diagram showing a screen listing errors in image forming apparatuses.
Figure 9B:
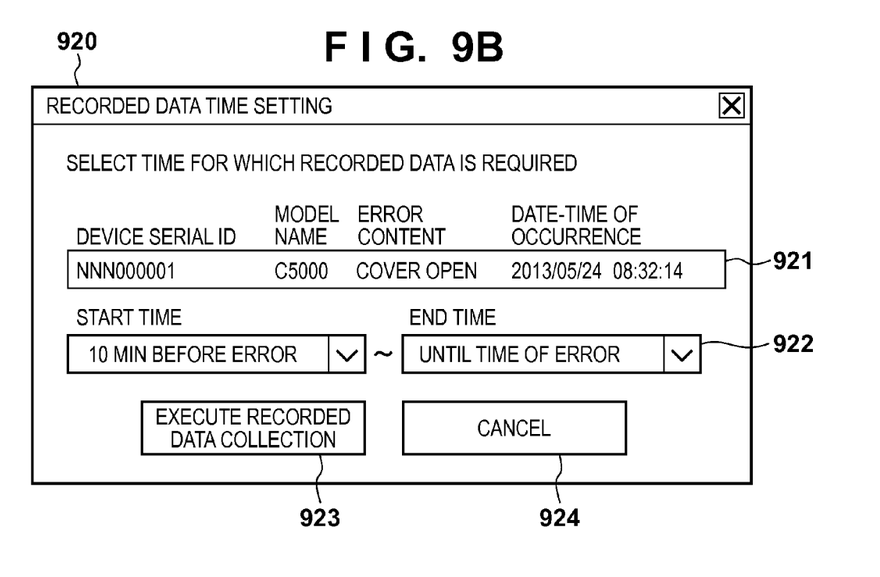
FIG. 9B is a diagram showing a screen for requesting recorded video.

Here, an example of a screen showing errors in the image forming apparatuses 111 that is displayed on the Web UI by the device management server 101, and means for accepting a request for recorded video at the time of an error will be described using FIG. 9A. This display by the Web UI may also be performed on the user interface of the device management client 104 or on another terminal. An error list screen 910 is a user interface screen serving as a confirmation screen of errors in the image forming apparatuses 111 that is displayed on the Web UI by the device management server 101. An error list 911 displays a list of the image forming apparatuses 111 in which an error has occurred. Items displayed on the error list 911 include device serial ID for identifying the devices, model name, error content, and date-time of occurrence. Also, there is a checkbox for selecting, from the list, a device with respect to which recorded video is to be obtained. A recorded data collection button 912 is a button that is selected when obtaining recorded data, that is, recorded video, of the image forming apparatus 111 selected with the checkbox, and a cancel button 913 is selected when not obtaining recorded data. A period setting screen 920 in FIG. 9B is a Web UI that is displayed when the recorded data collection button 912 is selected. The time of recorded video is designated on this screen. In a selected error device 921, information regarding the image forming apparatus 111 whose checkbox is marked among the devices displayed in list form in the error list 911 is displayed. In a period 922, the start time and the end time of recorded video of the image forming apparatus 111 displayed in the error list 911 are designated. In this example, a time span from 10 minutes before the error in the image forming apparatus 111 occurred until the time that the error occurred is designated. The request of obtainment of recorded video of the designated time is completed by selecting a recorded data collection execution button 923. The request processing is cancelled when a cancel button 924 is designated. It should be obvious that if the checkboxes of a plurality of image forming apparatuses 111 are marked in the error list 911, the period setting screen 920 (time setting Web UI) is displayed and a period can be set for each of these image forming apparatuses. Whether a request has been input via the screens of FIGS. 9A and 9B is determined using step S811. Also, in the acceptance processing of step S812, information relating to the error selected on the error list screen 910, which is the target of the request for recorded data, and information relating to the time set on the period setting screen 920 are accepted.

Returning to the description of the flowchart in FIG. 8, the device management client 104, in step S821, checks whether or not a request for recorded video has been made to the device management server 101. At step S822, it is determined whether or not there is a request, and if there is not a request, the processing returns to step S821. If there is a request, the device management client 104 obtains information relating to the request from the device management server 101. This information includes, for example, the IDs of network cameras capable of monitoring the image forming apparatus having the device serial ID selected on the error list screen 910 and the time designated on the period setting screen 920. In step S823, the device management client 104 makes a request for recorded video to the camera management server 120, with the information received from the device management server 101 together with the request as conditions. That is, a request for recorded video is made to the camera management server 120 by designating the network camera IDs of network cameras capable of monitoring the image forming apparatus targeted for monitoring and a period. The camera management server 120, in step S831, searches for corresponding recorded video based on the conditions designated by the device management client 104, and, at step S832, transmits recorded video found to the device management client 104. If the search fails to find corresponding recorded video, that fact is transmitted. Subsequently, the device management client 104, at step S824, receives the recorded video transmitted from the camera management server 120. Next, the device management client 104, at step S825, transmits the recorded video to the device management server 101. The device management server 101, at step S813, receives the recorded video from the device management client 104. If the client receives video captured by a plurality of cameras for an overlapping period, the client, at step S825, prioritizes the "image quality" value for each network camera included in a network camera/device correspondence table 1000, and transmits video having a higher image quality, that is, video having a higher priority, to the device management server 101.

Processing for Requesting Recorded Video

Figure 10:
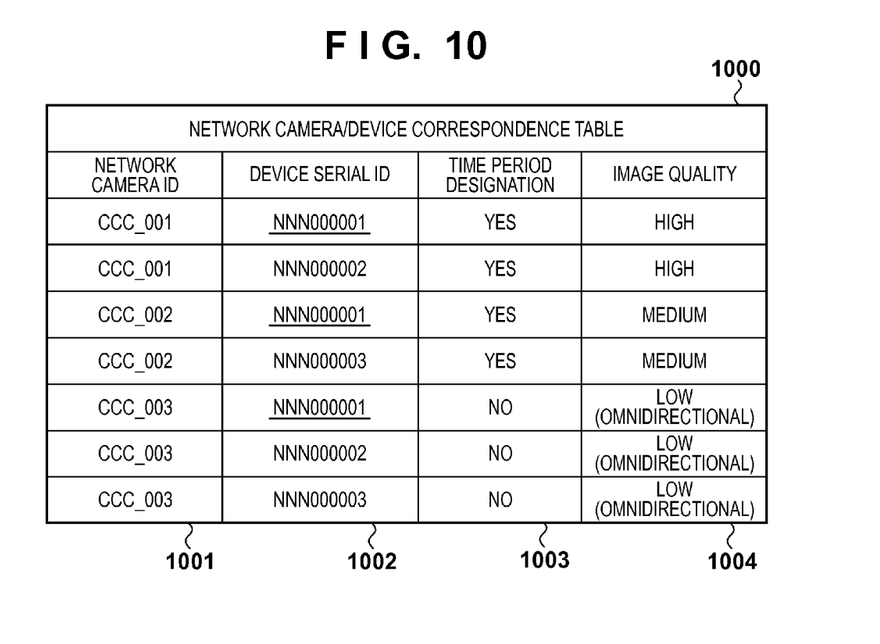
FIG. 10 is a diagram showing a network camera/device correspondence table.

FIG. 10 is a diagram showing an example of the relationship between the network cameras 121 and the image forming apparatuses 111 that is held in the database 331 of the device management server 101. The network camera/device correspondence table 1000 manages the association as to which network camera 121 captures what image forming apparatus 111. That is, network cameras capable of monitoring a certain image forming apparatus can be specified using the network camera/device correspondence table 1000. Network Camera ID 1001 is a column storing the network camera ID of the network camera 121. Device Serial ID 1002 is a column storing the device serial ID of the image forming apparatus 111. Time Period Designation 1003 is a column showing whether the network camera 121 having the network camera ID 1001 can capture the image forming apparatus 111 having the device serial ID 1002 for only a specific time period or for 24 hours. In this column, "Yes" indicates image capture for only a specific time period, and "No" indicates 24-hour image capture. Image Quality 1004 shows the image quality at the time of image capture by the network camera 121 having the network camera ID 1001. In this column, "High" indicates high definition image quality, "Medium" indicates average image quality, and "Low (omnidirectional)" indicates that image quality is low. While "low (omnidirectional)" indicates low image quality, omnidirectional (360 degree) image capture is possible from the installation location of the network camera 121, enabling all the image forming apparatuses 111 on the same floor to be targeted for image capture. Note that with regard to time zones in which image capture is performed, the time zone for each of the designated network cameras can be held in the camera management server 120, for example, and the camera management server 120 can capture and record video using the network cameras 121 in accordance with these time zones.

Figure 11:
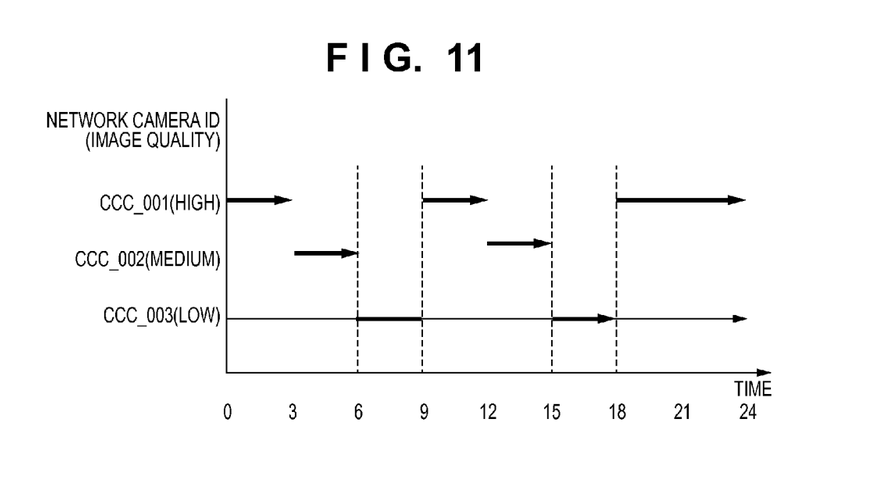
FIG. 11 is a figure showing times during which network cameras capture images of a specific image forming apparatus.

FIG. 11 is a diagram showing exemplary image capture time periods of the network cameras 121 with respect to a specific image forming apparatus 111. In this example, it is shown by which network camera 121 and when the image forming apparatus 111 in FIG. 10 whose device serial ID 1002 is "NNN000001" is captured. The vertical axis in FIG. 11 shows network camera IDs 1001 and corresponding image qualities 1004, and the horizontal axis shows (24-hour) time. Although the network camera 121 whose network camera ID 1001 is "CCC_003" performs 24-hour image capture, image quality is low, and thus for time periods during which other cameras having higher image quality are performing image capture, the video recorded by the other cameras having higher image quality is preferentially employed. That is, video recorded by the network camera 121 whose network camera ID 1001 is "CCC_001" is employed from 00:00 until 03:00. Also, video recorded by the network camera 121 whose network camera ID 1001 is "CCC_002" is employed from 03:00 until 06:00. Subsequently, video recorded by the network camera 121 whose network camera ID 1001 is "CCC_003" is employed from 06:00 until 09:00. The network camera 121 having higher image quality is similarly prioritized for subsequent time periods, and video taken by the network camera 121 having low image quality is only employed in the case where the network cameras 121 having medium and high image quality are not performing image capture. As described above, the camera management server 120 determines which network camera 121 to prioritize. The video that is employed is transmitted from the device management client 104 to the device management server 101 in step S825. Alternatively, the device management client 104 may transmit all received video to the device management server 101 in step S825, and the device management server 101 may record video selected based on image quality.

The above processing relates to means by which the device management client 104 makes a request for recorded video to the camera management server 120 in step S823 of FIG. 8. That is, it is shown that the device management client 104, by designating network camera IDs 1001 and information on the time period (922) of recorded data to the camera management server 120, is able to obtain desired recorded video.

In the present embodiment, the case was described where recorded video corresponding to the history of errors that have occurred in the image forming apparatuses 111 is obtained, although it should be obvious that logs, that is, history information, relating to other events, such as a job log or an operation log, may be employed in addition to the error history.

According to the present embodiment, in the case where an error occurs while an image forming apparatus is in use, video regarding the targeted image forming apparatus can be extracted from recorded video that has already been recorded. Information relating to the circumstances of the error and recorded video that serves to support this information can thereby be referred to.

Note that the network camera/device correspondence table 1000 in FIG. 10 was described as being held in the device management server 101. However, the camera management server 120 may have the network camera/device correspondence table 1000. In this case, the camera management server 120 specifies the network camera IDs corresponding to the device serial ID and selects video based on the image quality, that is, the priority order. It should be obvious that device serial IDs may also be used as a video search condition instead of the network camera IDs. Also, the device management client 104 may specify the network camera IDs corresponding to the device serial ID, even in the case where the device management server 101 has the network camera/device correspondence table 1000. In either case, it is sufficient if a network camera that monitors the image forming apparatus targeted for monitoring can be specified.

Embodiment 2

In Embodiment 1, the case where recorded video that has already been recorded in the camera management server 120 is obtained when an error occurs in an image forming apparatus 111 was described. However, recording needs to be scheduled in the case where video of an image forming apparatus 111 in which an error may subsequently occur is required. In view of this, in the present embodiment, processing for specifying an image forming apparatus 111 that the device administrator wants to record and a future time and performing scheduled recording will be described using the flowchart of FIG. 12.

Processing for Obtaining Scheduled Recorded Video

Figure 12:
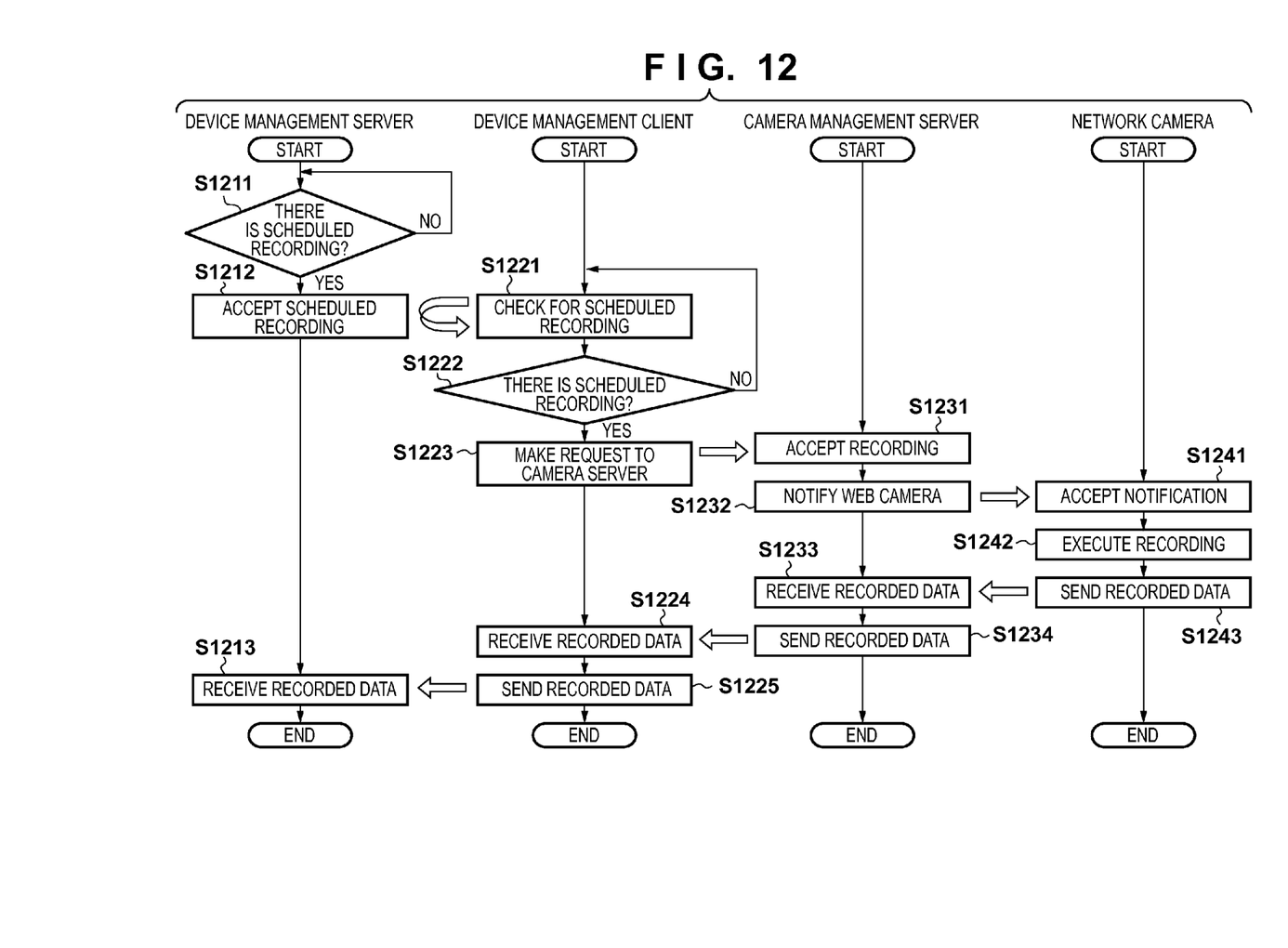
FIG. 12 is a flowchart showing processing in which the device management server receives recorded video that was scheduled.

FIG. 12 is a flowchart showing processing in which the device management server 101 illustrating the present embodiment schedules video recording of the area around a specific image forming apparatus 111 at a future time and obtains recorded video. Since much of the processing content overlaps with the flowchart of FIG. 8, only the differences from FIG. 8 will be described. Given that a difference from the processing of FIG. 8 is the scheduled recording of future video relating to an image forming apparatus 111, recorded video does not exist in the camera management server 120 at the point in time at which a request is received. Therefore, when the scheduled time arrives, the camera management server 120 instructs a network camera 121 having a network camera ID corresponding to the device serial ID designated by the device management server 101 to perform image capture, and the network camera 121, in accordance with the instruction, executes image capture and transmits recorded video to the camera management server 120.

In terms of the flowchart, the camera management server 120, at step S1231, accepts a request for scheduled recording from the device management client 104 together with the device serial ID of the image forming apparatus targeted for monitoring, an image capture start date-time (scheduled time) and an end date-date, for example. Next, the camera management server 120, in step S1232, notifies the network camera 121 to record at the scheduled time. Subsequently, the network camera 121, at step S1241, receives the notification from the camera management server 120, and records video of the target image forming apparatus 111 for the scheduled time period at step S1242. Next, at step S1243, the network camera 121 sends the recorded video to the camera management server 120. At step S1233, the camera management server 120 receives the recorded data from the network camera 121. Subsequent processing is similar to the processing of FIG. 8.

According to the present invention, information relating to a future state of an image forming apparatus 111 and recorded video that serves to support this information can be referred to, since scheduled recording of a specified image forming apparatus 111 at a set time or under set conditions can be performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-219508, filed Oct. 22, 2013, which is hereby incorporated by reference herein in its entirety.

What is claimed is:

1. A network system comprising a management system, in which network devices are managed, a client, and a camera system having a network camera, the management system including:
a first memory storing instructions; and
a first processor which is capable of executing the instructions stored in the first memory causing the management system to:
manage device information of each of the network devices, wherein the device information includes device identification information of each network device:
manage camera identification information of a network camera in association with the device identification information of a managed network device which the network camera is capable of monitoring;
receive error log records recorded by a function of each network device;
store the received error log records into a database, wherein the camera identification information is not included in any error log record and the device identification information and time of error occurrence are included in each error log record;

provide an error device list screen based on the device information of each network device and the stored error log records;

designate a period of recorded data to be requested to the camera system, wherein the period of recorded data is designated by selecting a time backward from an error occurrence in a network device selected on the error device list screen; and manage a first request including camera identification information and the designated period, the camera identification information being managed in association with the device identification information of the network device selected on the error device list screen, and the client including:

a second memory storing instructions; and a second processor which is capable of executing the instructions stored in the second memory causing the client to:

perform confirmation for existence of the first request to the management system;

obtain, as a result of the confirmation, the first request including the camera identification information and the designated period from the management system;

make a second request for recorded data to the camera system, using the camera identification information and the designated period;

receive recorded data in response to the second request from the camera system; and transmit the recorded data to the management system.

2. The network system according to claim 1, wherein the instructions stored in the first memory further cause the management system to manage the camera identification information of a plurality of network cameras capable of monitoring the network device, a time zone during which each network camera monitors the network device, and image quality.

3. The network system according to claim 1, wherein the first request includes the camera identification information of a plurality of network cameras capable of monitoring the network device selected on the error device list screen.

4. The network system according to claim 1, wherein the instructions stored in the second memory further cause the client to:

make a recording request for recording by the network camera to the camera system, and make a request for recorded data that is recorded in response to the recording request to the camera system.

5. The network system according to claim 1, wherein the recorded data that is transmitted to the management system is, with regard to a period during which recording by a plurality of network cameras overlaps, recorded data captured by one network camera selected based on image quality.

6. A device management method that is used by a network system including a management system, in which a network device is managed, a client, and a camera system having a network camera, the method comprising:

managing, by the management system, device information of each of one or more network devices, wherein the device information includes device identification information of each network device;

managing, by the management system, camera identification information of a network camera in association with the device identification information of a managed network device which the network camera is capable of monitoring;

receiving, by the management system, error log records recorded by a function of each network device;

storing the received error log records into a database, wherein the camera identification information is not included in any error log record and the device identification information and time of error occurrence are included in each error log record;

providing, by the management system, an error device list screen based on the device information of each network device and the stored error log records;

designating, by the management system, a period of recorded data to be requested to the camera system wherein the period of recorded data is designated by selecting a time backward from an error occurrence in a network device selected on the error device list screen;

managing, by the management system, a first request including identification information and the designated period, the camera identification information being managed in association with the device identification information of the network device selected on the error device list screen;

performing, by the client, confirmation for existence of the first request to the management system;

obtaining, by the client, the camera identification information and the designated period from the management system;

making a second request, by the client, for recorded data to the camera system, using the camera identification information and the designated period;

receiving recoded data in response to the second request from the camera system; and transmitting, by the client, the recorded data to the management system.

* * * * *